US012694471B2

(12) United States Patent
Horii

(10) Patent No.: US 12,694,471 B2
(45) Date of Patent: *Jul. 28, 2026

(54) IMAGE RECOGNITION WITH A WIDE AREA RECOGNITION TARGET NETWORK THAT FEEDS A NARROW AREA RECOGNITION TARGET NETWORK

(71) Applicant: Panasonic Intellectual Property Management Co., Ltd., Osaka (JP)

(72) Inventor: Toshihide Horii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 449 days.

This patent is subject to a terminal disclaimer.

(21) Appl. No.: 18/030,989

(22) PCT Filed: Jun. 25, 2021

(86) PCT No.: PCT/JP2021/024225
§ 371 (c)(1),
(2) Date: Apr. 8, 2023

(87) PCT Pub. No.: WO2022/074878
PCT Pub. Date: Apr. 14, 2022

(65) Prior Publication Data
US 2023/0377094 A1      Nov. 23, 2023

(30) Foreign Application Priority Data
Oct. 8, 2020    (JP) ................................. 2020-170752

(51) Int. Cl.
*G06T 3/4046*      (2024.01)
*G06T 5/50*        (2006.01)

(52) U.S. Cl.
CPC .............. *G06T 3/4046* (2013.01); *G06T 5/50* (2013.01); *G06T 2207/20212* (2013.01)

(58) Field of Classification Search
None
See application file for complete search history.

(56) References Cited

U.S. PATENT DOCUMENTS 10,783,640 B2 *    9/2020   Chen .......................... G06T 7/12
10,796,184 B2 *   10/2020   Senay .................... G06V 20/58
(Continued)

FOREIGN PATENT DOCUMENTS

CN          111712853 A      9/2020
WO        2019159419 A1     8/2019

OTHER PUBLICATIONS

Peng, Chengli, and Jiayi Ma. "Semantic segmentation using stride spatial pyramid pooling and dual attention decoder." Pattern Recognition 107 (2020): 107498 (retrieved from https://www.sciencedirect.com/science/article/pii/S0031320320303010, available online Jun. 13, 2020) (Year: 2020).*

(Continued)

*Primary Examiner* — David Orange
(74) *Attorney, Agent, or Firm* — Renner, Otto, Boisselle & Sklar, LLP

(57)          ABSTRACT

Aspects relate to a processing device for increasing the accuracy of image recognition in a neural network that does not include a fully connected layer. A first processor generates a first feature map by executing processing of a first neural network on a target image. An enlarger enlarges the first feature map. A combiner combines the first feature map and the target image and generates a combined image. A second processor generates a second feature map by executing processing of a second neural network on the combined image.

3 Claims, 7 Drawing Sheets

(56) References Cited

U.S. PATENT DOCUMENTS

| | | | |
|---|---|---|---|
| 11,315,235 B2 * | 4/2022 | Horii | ........................ G06N 3/09 |
| 2020/0380665 A1 | 12/2020 | Horii | |
| 2021/0248761 A1 * | 8/2021 | Liu | ......................... G06N 3/08 |

OTHER PUBLICATIONS

Chen, Ying-Nong, et al. "Facial/license plate detection using a two-level cascade classifier and a single convolutional feature map." International Journal of Advanced Robotic Systems 12.12 (2015): 183. (Year: 2015).*

International Search Report for corresponding Application No. PCT/JP2021/024225, mailed Sep. 21, 2021.

Extended European Search Report for corresponding Application No. 21877182.2 dated Mar. 11, 2024.

Chen, Wuyang et al., Collaborative Global-Local Networks for Memory-Efficient Segmentation of Ultra-High Resolution Images, 2019 IEEE/CVF Conference on Computer Vision and Pattern Recognition (CVPR), IEEE, Jun. 15, 2019 (Jun. 15, 2019), pp. 8916-8925.

Chen at al., "Collaborative Global-Local Networks for Memory-Efficient Segmentation of Ultra-High Resolution Images", 2019 IEEE/CVF Conference on Computer Vision and Pattern Recognition (CVPR), IEEE, 2019, pp. 8924-8933.

* cited by examiner

500

IMAGE RECOGNITION WITH A WIDE AREA RECOGNITION TARGET NETWORK THAT FEEDS A NARROW AREA RECOGNITION TARGET NETWORK

TECHNICAL FIELD

The present disclosure relates to processing technology, particularly, a processing method for executing processing on input information and a processing device using the same.

BACKGROUND ART

For example, Deep Learning is used for image recognition processing. Deep Learning is known as a method of machine learning using a multilayer neural network. For example, a convolutional neural network is used for the multilayer neural network. The convolutional neural network is formed by a multilayer neural network that repeats convolution and pooling of a local region. Furthermore, a structure of a fully convolutional neural network in which a fully connected layer constituting the convolutional neural network is a convolution layer has been proposed (see, for example, Patent Literature 1).

CITATION LIST

Patent Literature

[Patent Literature 1] WO 19/159419 A

SUMMARY OF INVENTION

Technical Problem

Since the fully convolutional neural network is a stack of processing of local regions, a positional relation of elements in an image to be processed is not specified. In order to improve the accuracy of image recognition in the neural network, it is preferable that the positional relation of the elements in the image can be specified.

The present disclosure has been made in view of such a situation, and an object thereof is to provide technology for improving the accuracy of image recognition in a neural network that does not include a fully connected layer.

Solution to Problem

In order to solve the above problem, a processing device according to one aspect of the present disclosure includes: a first processor that executes processing of a first neural network on a target image to be processed and generates a first feature map having a smaller size than the target image; an enlarger that enlarges the first feature map generated in the first processor to have the same size as the target image; a combiner that combines the first feature map enlarged in the enlarger and the target image and generates a combined image; and a second processor that executes processing of a second neural network on the combined image generated in the combiner and generates a second feature map having a smaller size than the target image and a larger size than the first feature map. The first neural network of the first processor and the second neural network of the second processor do not include a fully connected layer. At the time of learning, first-stage learning is performed only on the first neural network of the first processor. At the time of learning, second-stage learning is performed on the second neural network of the second processor in a state where the first-stage learning has been performed on the first neural network.

Another aspect of the present disclosure is a processing method. This method includes: a step of executing processing of a first neural network on a target image to be processed and generating a first feature map having a smaller size than the target image; a step of enlarging the generated first feature map to have the same size as the target image; a step of combining the enlarged first feature map and the target image and generating a combined image; and a step of executing processing of a second neural network on the generated combined image and generating a second feature map having a smaller size than the target image and a larger size than the first feature map. The first neural network and the second neural network do not include a fully connected layer. At the time of learning, first-stage learning is performed only on the first neural network. At the time of learning, second-stage learning is performed on the second neural network in a state where the first-stage learning has been performed on the first neural network.

Note that arbitrary combinations of the above components and modifications of the expressions of the present disclosure between methods, devices, systems, computer programs, recording media recording the computer programs, and the like are also effective as aspects of the present disclosure.

Advantageous Effects of Invention

According to the present disclosure, the accuracy of image recognition in a neural network that does not include a fully connected layer can be improved.

DESCRIPTION OF EMBODIMENTS

Before specifically describing embodiments of the present disclosure, an outline of the embodiments will be described. The embodiment relates to a processing device that executes image recognition processing on an image to be processed (hereinafter, referred to as a "target image") and specifies elements in the target image. For the image recognition processing, the use of a fully convolutional neural network that does not include a fully connected layer is possible. In the fully convolutional neural network, processing of a convolution layer and a pooling layer is repeated, and an image in which segmentation by color painting is performed on an included object (hereinafter, referred to as a "segmentation image" or a "feature map") is output.

However, as described above, since the fully convolutional neural network is a stack of processing of local regions, a positional relation of the elements in the target image is not specified. Since the accuracy of image recognition is improved by using the positional relation of the elements in the target image, it is desirable to specify the positional relation of the elements in the target image. On the other hand, in order to specify the positional relation of the elements in the target image, it is necessary to widen a region to be recognized by the fully convolutional neural network. However, by widening the region, the accuracy of the image recognition in the region is deteriorated. For this reason, it is required to achieve both specifying the positional relation of the elements in the target image and improving the accuracy of the image recognition in the region.

A processing device according to the present embodiment includes a network (hereinafter, referred to as a "first network") that recognizes a wide area and a network (hereinafter, referred to as a "second network") that recognizes a narrow area, and inputs a processed image to the first network. An image (hereinafter, referred to as a "combined image") obtained by combining a feature map (hereinafter, referred to as a "first feature map") generated by the first network and the processed image is input to the second network. A feature map (hereinafter, referred to as a "second feature map") generated by the second network is output.

Figures 1A, 1B:
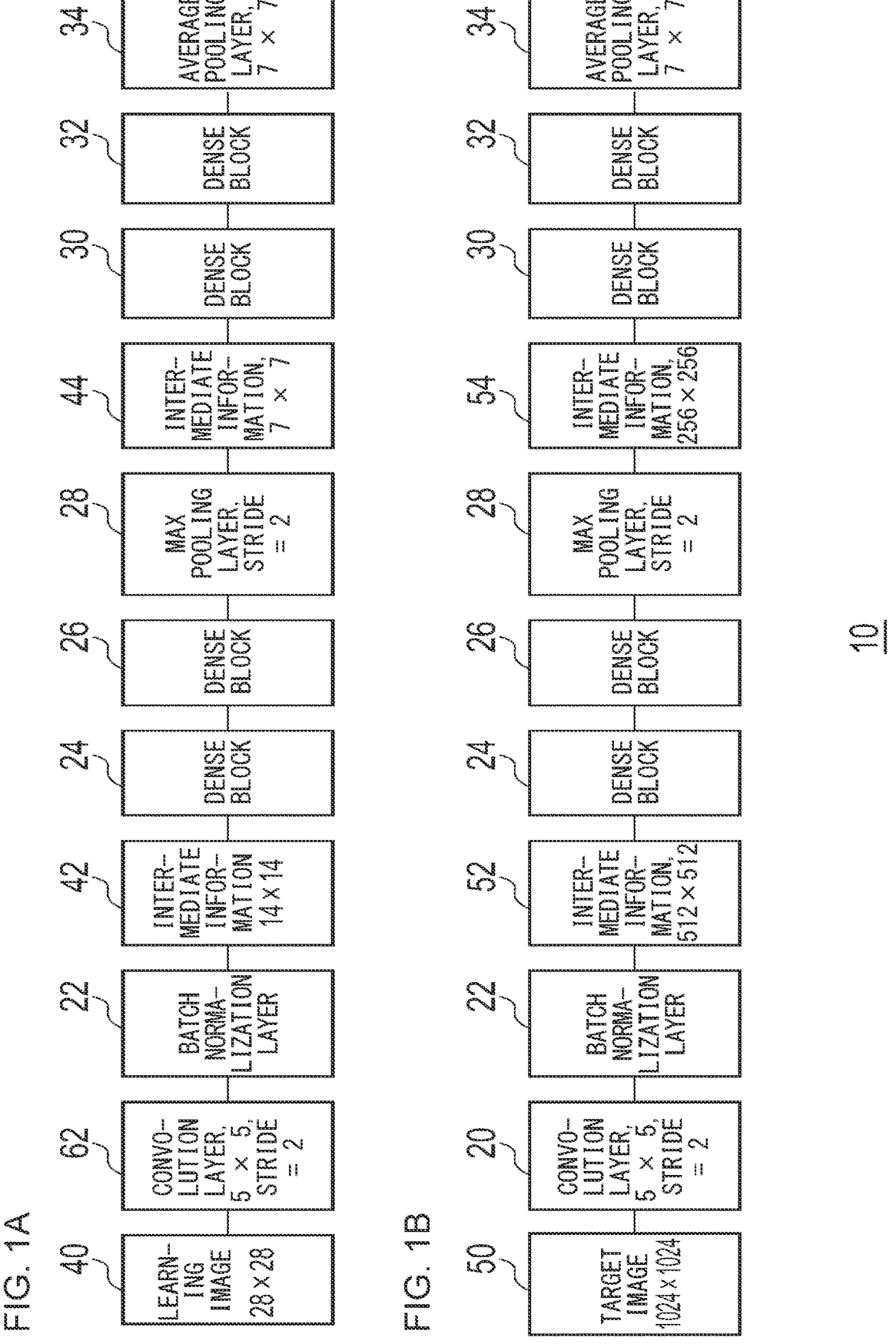
FIGS. 1A and 1B are diagrams illustrating a configuration of a processing device to be compared with the present embodiment.

FIGS. 1A and 1B illustrate a configuration of a processing device 10 to be compared. In particular, FIG. 1A illustrates a configuration for learning processing, and FIG. 1B illustrates a configuration for recognition processing. The processing device 10 in FIG. 1A and the processing device 10 in FIG. 1B may be the same device or different devices.

As illustrated in FIG. 1A, the processing device 10 includes a convolution layer 20, a batch normalization layer 22, a dense block 24, a dense block 26, a max pooling layer 28, a dense block 30, a dense block 32, and an average pooling layer 34 as the configuration for the learning processing. In the learning processing, a learning image 40 is used. The learning image 40 is an image in which a result of image recognition is prepared in advance as teacher data. The learning image 40 has, for example, a size of "28×28". This can be said to be, for example, a partial image, that is, a detailed image, of an image having a size of "1024×1024". The learning image 40 is input to the convolution layer 20.

The convolution layer 20 executes spatial filtering while shifting a spatial filter having a size smaller than the size of an input image, for example, the learning image 40. In the convolution layer 20, the size of the spatial filter is defined as "5×5", and a stride that is a width to shift the spatial filter is defined as "2". Since the spatial filtering is known technology, the description thereof is omitted here. The spatial filtering corresponds to convolution processing, and a feature amount of an image is extracted by the convolution processing. Padding or the like may be executed in the convolution layer 20. Further, the convolution layer 20 may perform a plurality of spatial filtering on the image in parallel using a plurality of spatial filters in parallel. By the parallel use of such a plurality of spatial filters, the image increases. The number of spatial filters used in parallel in the convolution layer 20 is called the number of channels. Known technology may be used for the batch normalization layer 22. Intermediate information 42 is a result of processing performed by the convolution layer 20 and the batch normalization layer 22, and indicates information in the middle of processing. The intermediate information 42 has a size of "14×14".

Figure 2:
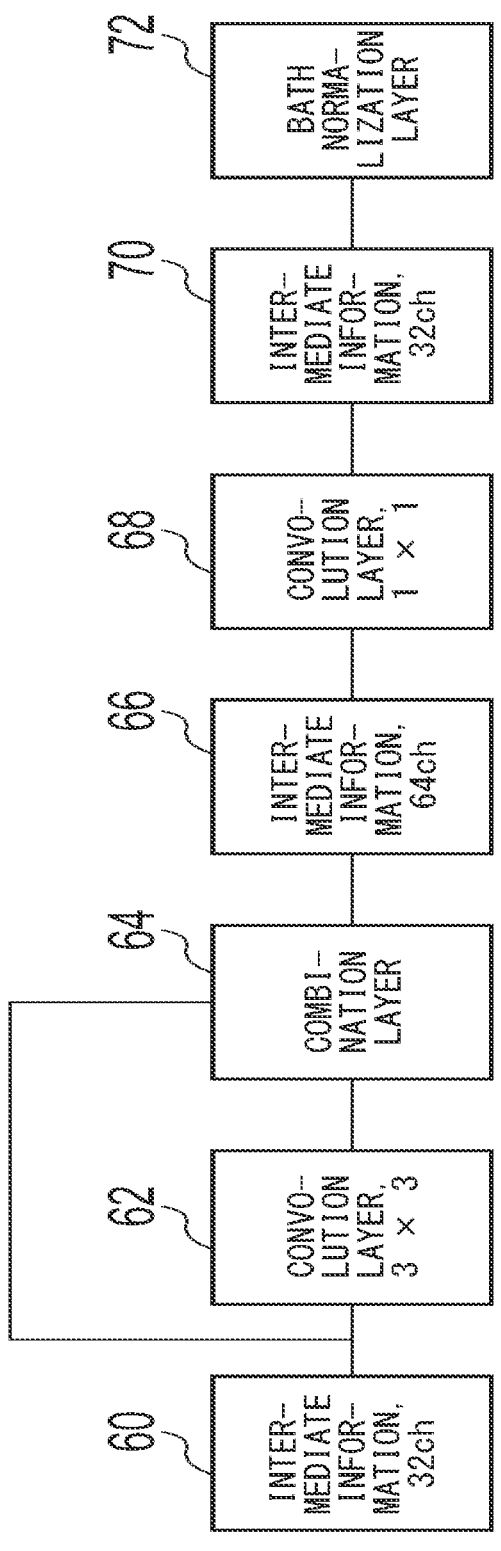
FIG. 2 is a diagram illustrating a configuration of a dense block in FIGS. 1A and 1B.

The dense block 24 is illustrated in FIG. 2. FIG. 2 illustrates a configuration of the dense block. As illustrated in the drawing, intermediate information 60, a convolution layer 62, a combination layer 64, intermediate information 66, a convolution layer 68, intermediate information 70, and a batch normalization layer 72 are included. Similarly to the intermediate information 42, the intermediate information 60, the intermediate information 66, and the intermediate information 70 indicate information in the middle of processing. For example, the intermediate information 60 has 32 channels, the intermediate information 66 has 64 channels, and the intermediate information 70 has 32 channels. The convolution layer 62 and the convolution layer 68 are similar to the convolution layer 20. A size of a spatial filter of the convolution layer 62 is defined as "3×3", and a size of a spatial filter of the convolution layer 68 is defined as "1×1". The combination layer 64 combines the intermediate information 60 and a processing result of the convolution layer 62 to generate the intermediate information 66. The intermediate information 60 and a processing result of the convolution layer 62 are combined as different channels. The batch normalization layer 72 is similar to the batch normalization layer 22. The description returns to FIG. 1A.

The dense block 26, the dense block 30, and the dense block 32 are configured similarly to the dense block 24. The dense block 24, the dense block 26, the dense block 30, and the dense block 32 are not limited to the configuration of FIG. 2, and may have different combinations of convolution layers and the like. In addition, the configurations of the dense block 24, the dense block 26, the dense block 30, and the dense block 32 may be different from each other.

The max pooling layer 28 is configured similarly to the convolution layer 20. The max pooling layer 28 reduces the size of the image by combining a plurality of pixels included in an arbitrary region in the image into one pixel. The max pooling layer 28 uses an average value of a plurality of pixel values in the region for one pixel to combine the plurality of pixels into one pixel. The pooling processing is performed to enhance robustness against translational movement of an average value in a region of interest. A stride that is a width to shift the region in the max pooling layer 28 is defined as "2".

The average pooling layer 34 performs pooling processing, similarly to the max pooling layer 28. The average pooling layer 34 uses a maximum value of a plurality of pixel values in a region for one pixel to combine a plurality of pixels into one pixel. The pooling processing is performed to enhance robustness against translational movement of a representative value in a region of interest. A size of the region in the average pooling layer 34 is defined as "7×7".

In the learning processing, coefficients of spatial filters of the convolution layer 20 and the convolution layers included in the dense block 24, the dense block 26, the dense block 30, and the dense block 32 are learned on the basis of the learning image 40 and the teacher data. Since known technology may be used for learning of the coefficients of the spatial filters under a situation where the learning image 40 and the teacher data are used, the description thereof will be omitted here.

As illustrated in FIG. 1B, the processing device 10 includes a convolution layer 20 to an average pooling layer 34 as a configuration for the recognition processing. This configuration is the same as that of FIG. 1A. Here, the coefficients of the spatial filters derived by the learning processing in FIG. 1A are set to the convolution layer 20 and the convolution layers included in the dense block 24, the dense block 26, the dense block 30, and the dense block 32. A target image 50 is an image to be subjected to recognition processing in the processing device 10, and has a size of "1024×1024", for example. The target image 50 is input to the convolution layer 20.

Since the convolution layer 20 to the average pooling layer 34 perform processing similar to the previous processing, the description thereof is omitted here. In authentication processing (also referred to as inference processing herein), intermediate information 52 and intermediate information 54 are generated. The intermediate information 52 has a size of "512×512", and the intermediate information 54 has a size of "256×256". A result of the authentication processing is output from the average pooling layer 34.

Since the learning image 40 has a size of "28×28" and the target image 50 has a size of "1024×1024", it can be said that the learning processing using the learning image 40 is performed for a narrow area. Therefore, the processing device 10 can recognize elements in the narrow area in detail. Here, when different elements are similar in the narrow area, it is difficult for the processing device 10 to distinguish these elements. On the other hand, when the elements are disposed at different positions in the entire image, the elements can be distinguished on the basis of a relative positional relation in which the elements are disposed. For this purpose, the learning processing needs to be performed on a wide area. However, in a case where the learning processing is performed on the wide area, the processing device 10 cannot recognize the elements in the narrow area in detail. Therefore, it is required to achieve both detailed recognition of the elements in the narrow area and recognition of the positions of the elements in the wide area.

Here, the present embodiment will be described in the order of (1) configuration, (2) learning processing, and (3) recognition processing.

(1) Configuration

Figure 3:
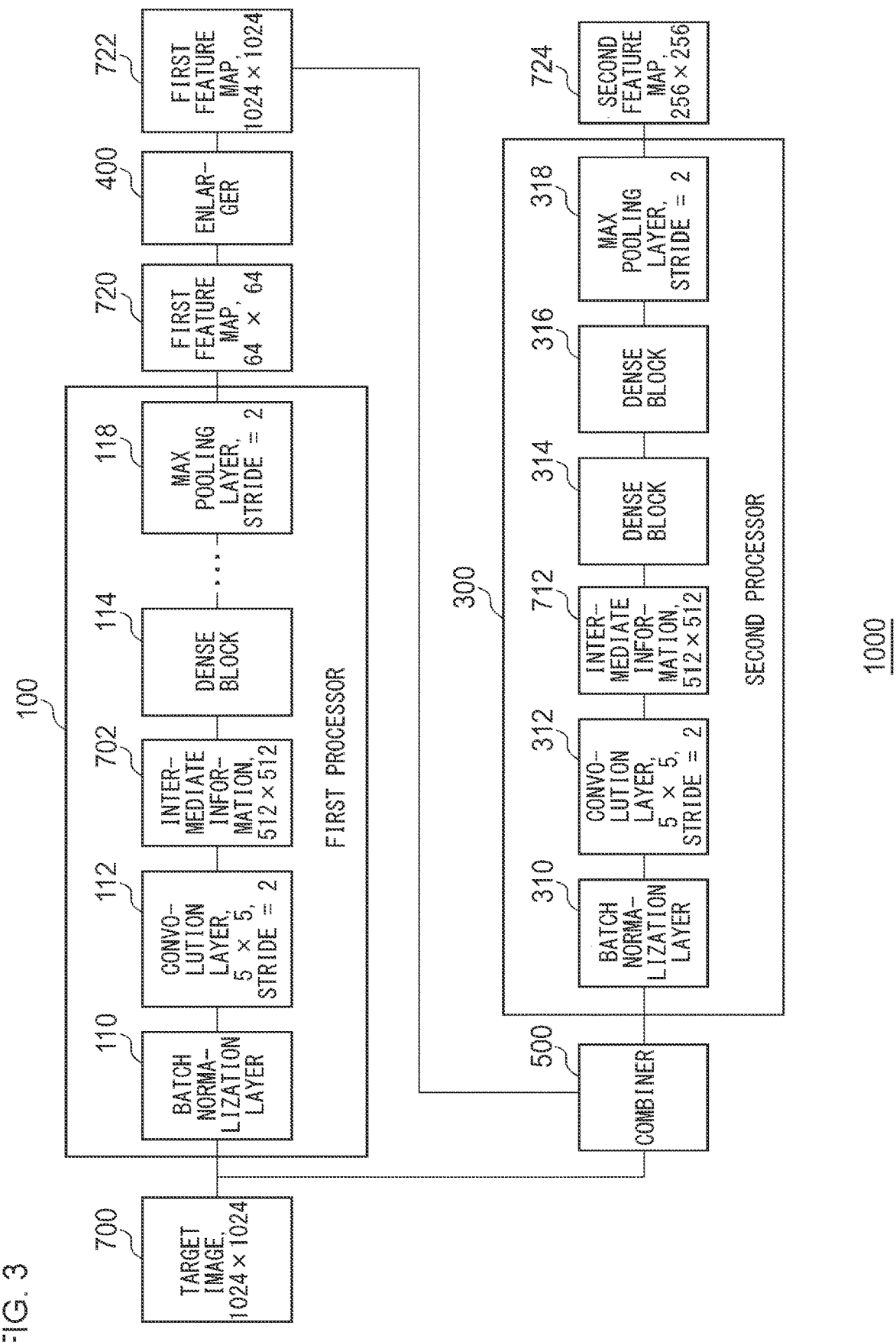
FIG. 3 is a diagram illustrating a configuration of a processing device according to the present embodiment.

FIG. 3 illustrates a configuration of a processing device 1000. This is a configuration for recognition processing. The processing device 1000 includes a first processor 100, an enlarger 400 (also referred to as an up-sampler for performing up-sampling herein), a combiner 500 (also referred to as a concatenator for performing concatenation herein), and a second processor 300. The first processor 100 includes a batch normalization layer 110, a convolution layer 112, a dense block 114, and a max pooling layer 118. A configuration between the dense block 114 and the max pooling layer 118 is omitted. The second processor 300 includes a batch normalization layer 310, a convolution layer 312, a dense block 314, a dense block 316, and a max pooling layer 318. The first processor 100 and the second processor 300 do not include a fully connected layer.

Figures 4A, 4B:
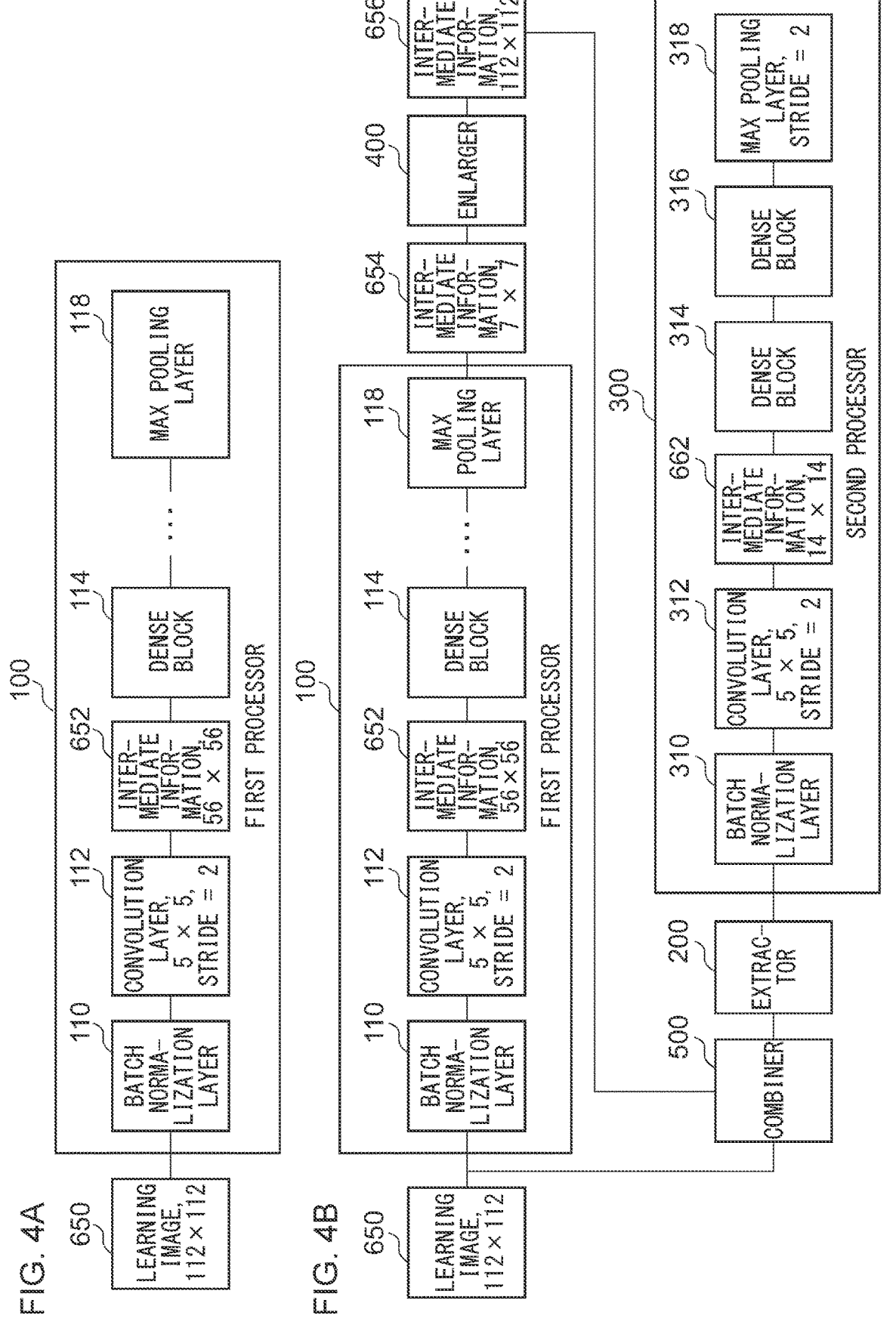
FIGS. 4A and 4B are diagrams illustrating a configuration of the processing device according to the present embodiment.

In the learning processing (also referred to as training processing herein), second-stage learning is performed after first-stage learning is performed. FIGS. 4A and 4B illustrate a configuration of the processing device 1000. FIG. 4A illustrates a configuration for the first-stage learning, and FIG. 4B illustrates a configuration for the second-stage learning. In the first-stage learning illustrated in FIG. 4A, learning is performed only for the first processor 100 in FIG. 3. In the first-stage learning, a learning image 650 is used. The learning image 650 is an image in which a result of image recognition is prepared in advance as teacher data.

The learning image 650 has, for example, a size of "112×112". The learning image 650 is input to the first processor 100.

The batch normalization layer 110, the convolution layer 112, the dense block 114, and the max pooling layer 118 in the first processor 100 are included in a first neural network. These execute processing similar to those in FIGS. 1A and 1B and 2. A size of a spatial filter of the convolution layer 112 is defined as "5×5", and a stride is defined as "2". A stride of the max pooling layer 118 is defined as "2".

In the first processor 100, intermediate information 652 is generated. The intermediate information 652 has a size of "56×56". In the first-stage learning, coefficients of spatial filters of convolution layers included in the first processor 100 are learned on the basis of the learning image 650 and the teacher data. Since known technology may be used for learning the coefficient of the spatial filter, the description thereof is omitted here.

The second-stage learning illustrated in FIG. 4B is performed on the second processor 300 in a state where the first-stage learning has been performed on the first processor 100. Therefore, the coefficient of the spatial filter derived by the first-stage learning is set to each convolution layer included in the first processor 100. The learning image 650 is also used in the second-stage learning. The learning image 650 is input to the first processor 100 and the combiner 500. The first processor 100 executes recognition processing on the learning image 650 and generates intermediate information 654. The intermediate information 654 has "7×7". Therefore, the first processor 100 converts the size of "112×112" into the size of "7×7".

Since the learning image 650 and the intermediate information 654 have different sizes, the learning image 650 and the intermediate information 654 cannot be combined. Therefore, the enlarger 400 is connected to the first processor 100, and the enlarger 400 is connected to the combiner 500. The enlarger 400 generates intermediate information 656 by enlarging the intermediate information 654 generated in the first processor 100. The intermediate information 656 has the same size of "112×112" as the learning image 650.

Figures 5A, 5B:
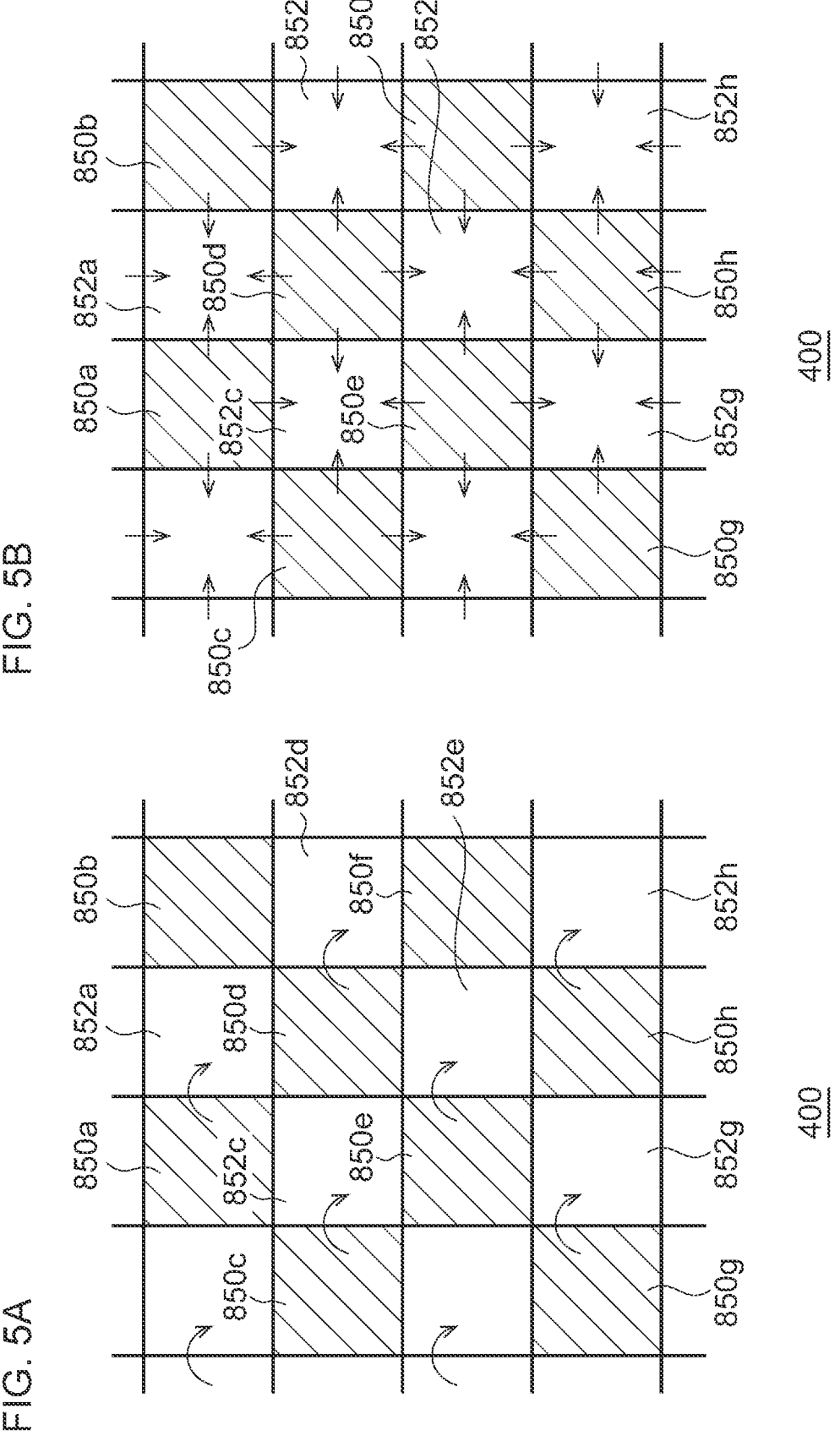
FIGS. 5A and 5B are diagrams illustrating an outline of processing in an enlarger of FIGS. 3 and 4B.

FIGS. 5A and 5B illustrate an outline of processing in the enlarger 400. FIG. 5A illustrates an example of processing in the enlarger 400. A first pixel 850a to an eighth pixel 850h collectively referred to as pixels 850 are pixels constituting the intermediate information 654. Additional pixels 852 are added between the adjacent pixels 850. For example, a third additional pixel 852c is added between the first pixel 850a, the third pixel 850c, the fourth pixel 850d, and the fifth pixel 850e. The same applies to a first additional pixel 852a, a fourth additional pixel 852d, a fifth additional pixel 852e, a seventh additional pixel 852g, and an eighth additional pixel 852h. By adding the additional pixels 852 to the pixels 850 as described above, the intermediate information 654 is enlarged. The enlarger 400 duplicates a value of the pixel 850 to the adjacent additional pixel 852. For example, a value of the third pixel 850c is duplicated to the third additional pixel 852c. As a result, the intermediate information 656 is generated.

FIG. 5B illustrates another example of processing in the enlarger 400. The pixels 850 and the additional pixels 852 are the same as those in FIG. 5A. The enlarger 400 uses values obtained by interpolating the values of the plurality of pixels 850 surrounding the additional pixel 852 for the additional pixel 852. For example, values in which the value of the first pixel 850a, the value of the third pixel 850c, the value of the fourth pixel 850d, and the value of the fifth pixel 850e are stored are used for the third additional pixel 852c.

Since known technology may be used for the interpolation, the description thereof will be omitted here. The description returns to FIG. 4B.

Figures 6A, 6B, 6C:
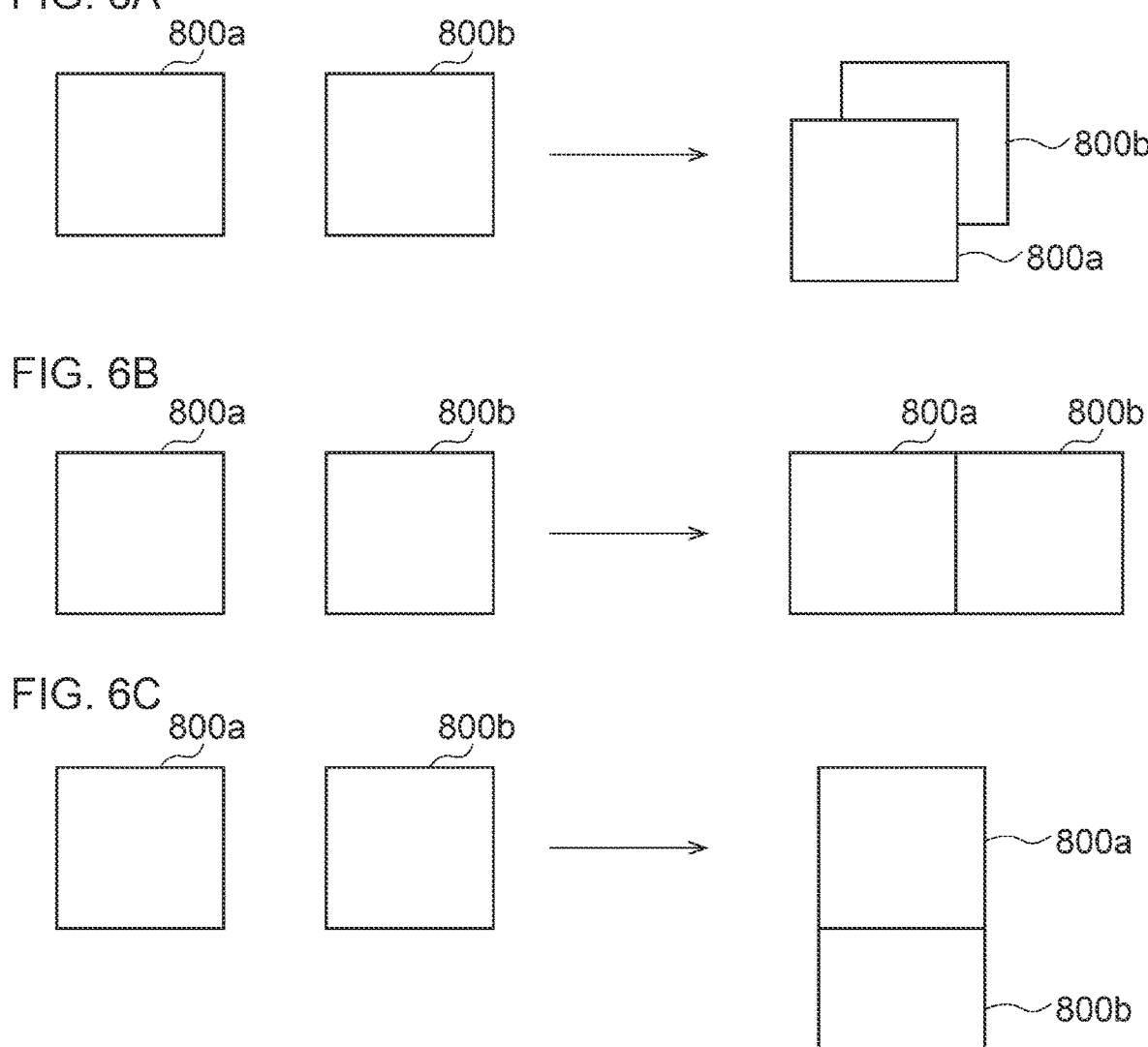
FIGS. 6A-6C are diagrams illustrating an outline of processing in a combiner of FIGS. 3 and 4B.

The combiner 500 combines the learning image 650 and the intermediate information 656. FIGS. 6A to 6C illustrate an outline of processing in the combiner 500. First input information 800*a* and second input information 800*b* are two pieces of information input to the combiner 500, and correspond to the learning image 650 and the intermediate information 656. In FIG. 6A, the first input information 800*a* and the second input information 800*b* are combined as different channels. In FIG. 6B, the first input information 800*a* and the second input information 800*b* are arranged in a lateral direction and become information of one channel. In FIG. 6C, the first input information 800*a* and the second input information 800*b* are arranged in a longitudinal direction and become information of one channel. The description returns to FIG. 4B. The combiner 500 may combine two inputs by performing four arithmetic operations such as addition and subtraction for each pixel.

The extractor 200 extracts a part of an image (hereinafter, referred to as the "combined image") combined in the combiner 500, for example, a center portion. The combined image has a size of "112×112", and the partially extracted combined image (hereinafter, also referred to as the "learning image") has a size of "28×28". The learning image is input to the second processor 300.

The batch normalization layer 310, the convolution layer 312, the dense block 314, the dense block 316, and the max pooling layer 318 in the second processor 300 are included in a second neural network. These execute processing similar to those in FIGS. 1A and 1B and 2. A size of a spatial filter of the convolution layer 312 is defined as "5×5", and a stride is defined as "2". A stride of the max pooling layer 318 is defined as "2".

The second processor 300 generates intermediate information 662. The intermediate information 662 has a size of "14×14". Therefore, the second processor 300 converts the size of "28×28" into the size of "7×7". In the first-stage learning, the coefficients of the spatial filters of the convolution layers included in the second processor 300 are learned on the basis of the learning image 650 and the teacher data, in a state where the first-stage learning has been performed. Since known technology may be used for learning the coefficient of the spatial filter, the description thereof is omitted here.

The learning image 650 of "112×112" is used for learning by the first processor 100, and the learning image of "28× 28" is used for learning by the second processor 300. Since the size of the learning image 650 is larger than the size of the learning image, the first network of the first processor 100 recognizes a wide area, and the second network of the second processor 300 recognizes a narrow area.

(3) Recognition Processing

The coefficients of the spatial filters derived by the learning processing in FIGS. 4A and 4B are set to the respective convolution layers in FIG. 3. In authentication processing illustrated in FIG. 3, a target image 700 is used. The target image 700 is an image to be subjected to recognition processing in the processing device 1000, and has a size of "1024×1024", for example. The target image 700 is input to the first processor 100 and the combiner 500. The extractor 200 is not used in the authentication processing.

Since the batch normalization layer 110 to the max pooling layer 118 in the first processor 100 execute processing similar to the above processing, the description thereof is omitted here. In the authentication processing, intermediate information 702 is generated. The intermediate information 702 has a size of "512×512". The first processor 100 generates a first feature map 720 by executing processing of the first neural network on the target image 700. The first feature map 720 has a size of "64×64".

In order to cause the first feature map 720 to have the same size as the target image 700, the enlarger 400 enlarges the first feature map 720 to generate a first feature map 722. The first feature map 722 has a size of "1024×1024". The combiner 500 generates a combined image by combining the first feature map 722 enlarged in the enlarger 400 and the target image 700. The combination processing may be performed as described above. The combiner 500 outputs the combined image to the second processor 300.

Since the batch normalization layer 310 to the max pooling layer 318 in the second processor 300 execute processing similar to the above processing, the description thereof is omitted here. In the authentication processing, the intermediate information 712 is generated. The intermediate information 712 has a size of "512×512". The second processor 300 generates a second feature map 724 by executing processing of the second neural network on the combined image. The second feature map 724 has a size of "256×256", which is smaller than that of the target image 700 and larger than that of the first feature map 720.

A subject of a device, a system, or a method in the present disclosure includes a computer. The computer executes a program, thereby implementing functions of the subject of the device, the system, or the method in the present disclosure. The computer includes a processor operating according to the program as a main hardware configuration. The type of the processor is not limited as long as the processor can realize the functions by executing the program. The processor includes one or more electronic circuits including a semiconductor integrated circuit (IC) or a large scale integration (LSI). The plurality of electronic circuits may be integrated on one chip or may be provided on a plurality of chips. The plurality of chips may be integrated into one device or may be provided in a plurality of devices. The program is recorded in a computer-readable non-transitory recording medium such as a ROM, an optical disk, or a hard disk drive. The program may be stored in advance in a recording medium, or may be supplied to the recording medium via a wide-area communication network including the Internet or the like.

Figure 7:
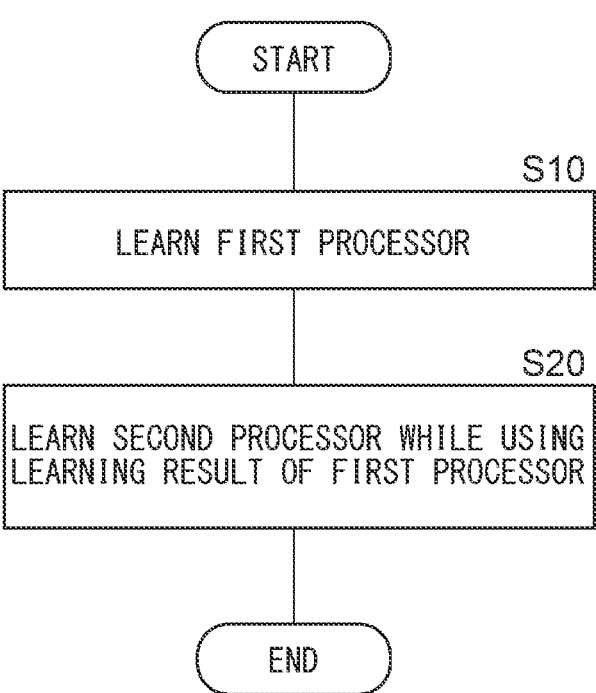
FIG. 7 is a sequence diagram illustrating a processing procedure by the processing device of FIGS. 4A and 4B.

The operation of the processing device 1000 having the above configuration will be described. FIG. 7 is a sequence diagram illustrating a processing procedure by the processing device 1000. The processing device 1000 executes the first-stage learning on the first processor 100 (S10). The processing device 1000 executes the second-stage learning on the extractor 200 while using a learning result of the first processor 100 (S12).

According to the present embodiment, at the time of learning, since the learning image 650 is input to the first processor 100 and the learning image of a part of the combined image is input to the second processor 300, a wide-area recognition target network and a narrow-area recognition target network can coexist. In addition, since the wide-area recognition target network and the narrow-area recognition target network coexist, it is possible to realize both specifying the positional relation of the elements in the target image and improving the accuracy of the image recognition in the region. In addition, since the combined image obtained by combining the target image 700 and the first feature map 722 is input to the second processor 300, it is possible to realize both specifying the positional relation of the elements in the target image and improving the accuracy of the image recognition in the region. In addition, since both specifying the positional relation of the elements in the target image and improving the accuracy of the image recognition in the region are realized, the accuracy of the image recognition in the neural network not including the fully connected layer can be improved.

In addition, since the size of the first feature map is changed by the enlarger 400, the conversion magnification in the first processor 100 and the conversion magnification in the second processor 300 can be set independently. In addition, since the conversion magnification in the first processor 100 and the conversion magnification in the second processor 300 are set independently, processing suitable for each of the first processor 100 and the second processor 300 can be executed. In addition, since processing suitable for each of the first processor 100 and the second processor 300 is executed, the recognition accuracy can be improved. In addition, since the two inputs are combined as different channels, the combination can be easily executed. In addition, since the two inputs are combined by performing four arithmetic operations for each pixel, the combination can be easily executed.

An outline of one aspect of the present disclosure is as follows. A processing device (1000) according to one aspect of the present disclosure includes: a first processor (100) that executes processing of a first neural network on a target image (700) to be processed and generates a first feature map (720) having a smaller size than the target image (700); an enlarger (400) that enlarges the first feature map (720) generated in the first processor (100) to have the same size as the target image (700); a combiner (500) that combines the first feature map (722) enlarged in the enlarger (400) and the target image (700) and generates a combined image; and a second processor (300) that executes processing of a second neural network on the combined image generated in the combiner (500) and generates a second feature map (724) having a smaller size than the target image (700) and a larger size than the first feature map (720). The first neural network of the first processor (100) and the second neural network of the second processor (300) do not include a fully connected layer. At the time of learning, first-stage learning is performed only on the first neural network of the first processor (100). At the time of learning, second-stage learning is performed on the second neural network of the second processor (300) in a state where the first-stage learning has been performed on the first neural network.

The combiner (500) may combine two inputs as different channels.

Another aspect of the present disclosure is a processing method. This method includes: a step of executing processing of a first neural network on a target image (700) to be processed and generating a first feature map (720) having a smaller size than the target image (700); a step of enlarging the generated first feature map (720) to have the same size as the target image (700); a step of combining the enlarged first feature map (722) and the target image (700) and generating a combined image; and a step of executing processing of a second neural network on the generated combined image and generating a second feature map (724) having a smaller size than the target image (700) and a larger size than the first feature map (720). The first neural network and the second neural network do not include a fully connected layer. At the time of learning, first-stage learning is performed only on the first neural network. At the time of learning, second-stage learning is performed on the second neural network in a state where the first-stage learning has been performed on the first neural network.

The present disclosure has been described on the basis of the embodiments. The embodiments are merely examples, and it is understood by those skilled in the art that various modifications can be made in the combination of the respective components or the respective processes, and that the modifications are also within the scope of the present disclosure.

INDUSTRIAL APPLICABILITY

According to the present disclosure, the accuracy of image recognition in a neural network that does not include a fully connected layer can be improved.

REFERENCE SIGNS LIST

10 processing device, 20 convolution layer, 22 batch normalization layer, 24, 26 dense block, 28 max pooling layer, 30, 32 dense block, 34 average pooling layer, 62 convolution layer, 64 combination layer, 68 convolution layer, 72 batch normalization layer, 100 first processor, 110 batch normalization layer, 112 convolution layer, 114 dense block, 118 max pooling layer, 200 extractor, 300 second processor, 310 batch normalization layer, 312 convolution layer, 314, 316 dense block, 318 max pooling layer, 400 enlarger, 500 combiner, 1000 processing device

The invention claimed is:

1. A processing device adapted to execute inference processing after learning processing, comprising:

a computer-readable non-transitory recording medium storing executable instructions that, in response to execution, causes the processing device to perform operations comprising:

processing, in the inference processing after learning, of a first neural network on a target image to be processed, thereby generating a first feature map having a smaller size than the target image, up-sampling, in the inference processing after learning, the first feature map to have the same size as the target image, concatenating, in the inference processing after learning, the first feature map that was up-sampled and the target image, thereby generating a combined image, and processing, in the inference processing after learning, of a second neural network on the combined image, thereby generating a second feature map having a smaller size than the target image and a larger size than the first feature map, wherein the first neural network does not include a fully connected layer, and the second neural network does not include a fully connected layer, in the learning processing, first-stage learning is performed only on the first neural network, and in the learning processing, a coefficient of a spatial filter derived by the first-stage learning is set to each convolution layer included in the first neural network, and second-stage learning is performed on the second neural network after the first-stage learning has been performed.

2. The processing device according to claim 1, wherein the concatenating combines two inputs as different channels.

3. A processing method performed by a processing device adapted to execute recognition processing after learning processing, the method including:

a computer-readable non-transitory recording medium storing executable instructions that, in response to execution, causes the processing device to perform the processing method, the processing method comprising:

a step of executing processing of a first neural network on a target image to be processed and generating a first feature map having a smaller size than the target image;

a step of up-sampling the generated first feature map to have the same size as the target image;

a step of concatenating the first feature map that was up-sampled and the target image to generate a combined image; and a step of executing processing of a second neural network on the generated combined image and generating a second feature map having a smaller size than the target image and a larger size than the first feature map, wherein the first neural network does not include a fully connected layer, and the second neural network does not include a fully connected layer, in the learning processing, first-stage learning is performed only on the first neural network, and in the learning processing, a coefficient of a spatial filter derived by the first-stage learning is set to each convolution layer included in the first neural network, and second-stage learning is performed on the second neural network after the first-stage learning has been performed on the first neural network.

* * * * *